(12) United States Patent
Sakamoto et al.

(10) Patent No.: US 7,037,238 B2
(45) Date of Patent: May 2, 2006

(54) CONTROL DEVICE AND CONTROL METHOD FOR A VEHICLE

(75) Inventors: Hiroshi Sakamoto, Hitachi (JP); Toshimichi Minowa, Mito (JP); Takashi Okada, Hitachi (JP); Mitsuo Kayano, Hitachi (JP); Tatsuya Ochi, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 11 days.

(21) Appl. No.: 10/730,028

(22) Filed: Dec. 9, 2003

(65) Prior Publication Data

US 2004/0116248 A1    Jun. 17, 2004

Related U.S. Application Data

(63) Continuation of application No. 10/377,751, filed on Mar. 4, 2003, and a continuation of application No. 10/058,383, filed on Jan. 30, 2002, now Pat. No. 6,449,546, and a continuation of application No. 09/652,658, filed on Aug. 31, 2000, now Pat. No. 6,560,521.

(30) Foreign Application Priority Data

Feb. 22, 2000   (JP) .............................. 2000-50529

(51) Int. Cl.
*B60K 41/04*   (2006.01)

(52) U.S. Cl. .............. 477/110; 477/107; 477/109; 74/335

(58) Field of Classification Search ............... 477/107, 477/109, 110; 74/335
See application file for complete search history.

(56) References Cited

U.S. PATENT DOCUMENTS

| 4,544,057 | A |   | 10/1985 | Webster et al. ........... 192/0.076 |
| 4,627,312 | A |   | 12/1986 | Fujieda et al. ................. 74/866 |
| 4,829,433 | A | * | 5/1989 | Nakano et al. .......... 364/424.1 |
| 4,842,115 | A | * | 6/1989 | Ohzono et al. ............ 192/85 P |
| 4,860,607 | A |   | 8/1989 | Numazawa et al. .......... 74/330 |
| 5,159,856 | A | * | 11/1992 | Yoshimura et al. ........... 74/867 |
| 5,313,856 | A |   | 5/1994 | Schneider et al. ............ 477/80 |
| 5,967,940 | A | * | 10/1999 | Yamaguchi .................. 477/107 |
| 6,095,001 | A |   | 8/2000 | Ruehle et al. ................. 74/331 |
| 6,244,368 | B1 | * | 6/2001 | Ando et al. ................. 180/65.2 |
| 6,328,670 | B1 | * | 12/2001 | Minowa et al. ................. 477/5 |
| 6,564,137 | B1 | * | 5/2003 | Minowa et al. ............... 701/70 |
| 6,832,150 | B1 | * | 12/2004 | Higashiyama et al. ...... 701/105 |

FOREIGN PATENT DOCUMENTS

| EP | 0 367 020 A1 |   | 5/1990 |
| EP | 1122109 |   | 8/2001 |
| JP | 59-050259 |   | 3/1984 |
| JP | 61-45163 |   | 3/1986 |
| JP | 63-130951 |   | 6/1988 |
| JP | 8-121202 | * | 5/1996 |
| JP | 10-122-004 | * | 5/1998 |
| JP | 2001-54208 | * | 2/2001 |
| WO | 98/31559 |   | 7/1998 |
| WO | 00/75532 |   | 12/2000 |

\* cited by examiner

*Primary Examiner*—Ha Ho
(74) *Attorney, Agent, or Firm*—Crowell & Moring LLP

(57) ABSTRACT

At the time of the change-speed, by correcting the torque reducing portion of an output shaft during the change-speed, the revolution number of an input shaft is controlled on the basis of the corrected torque reduction correcting value. Also, the torque of said input shaft is adjusted at the end of the change-speed on the basis of said torque correcting value.

3 Claims, 8 Drawing Sheets

FIG. 2
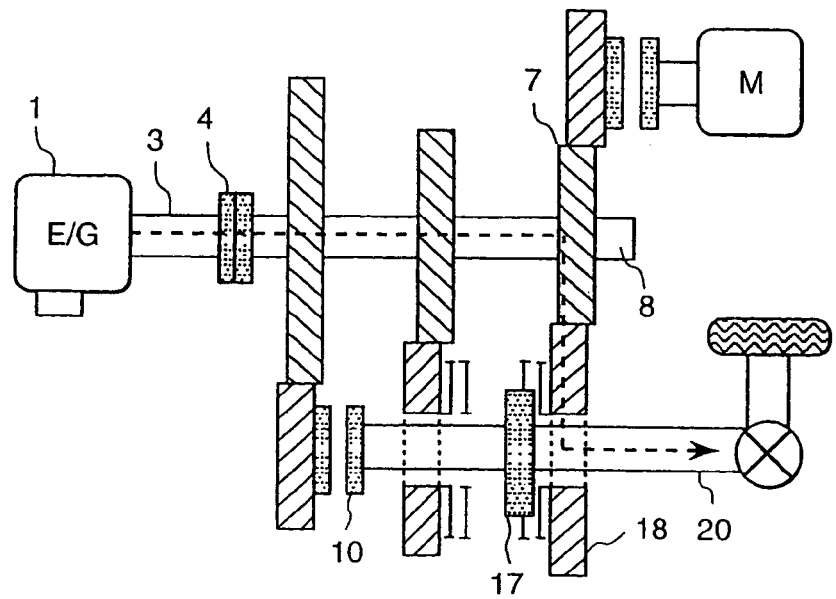
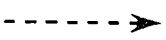
FIG. 3
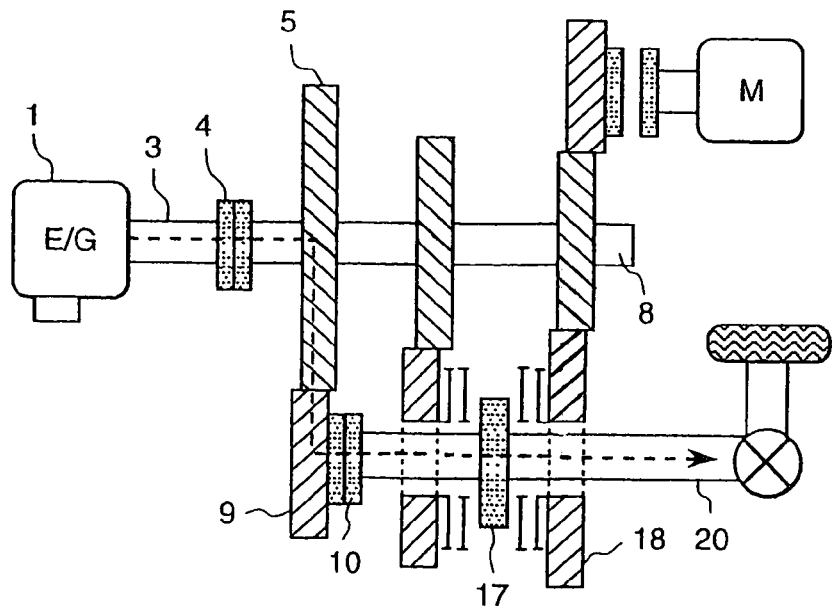

TORQUE TRANSMITTING PATH ------>

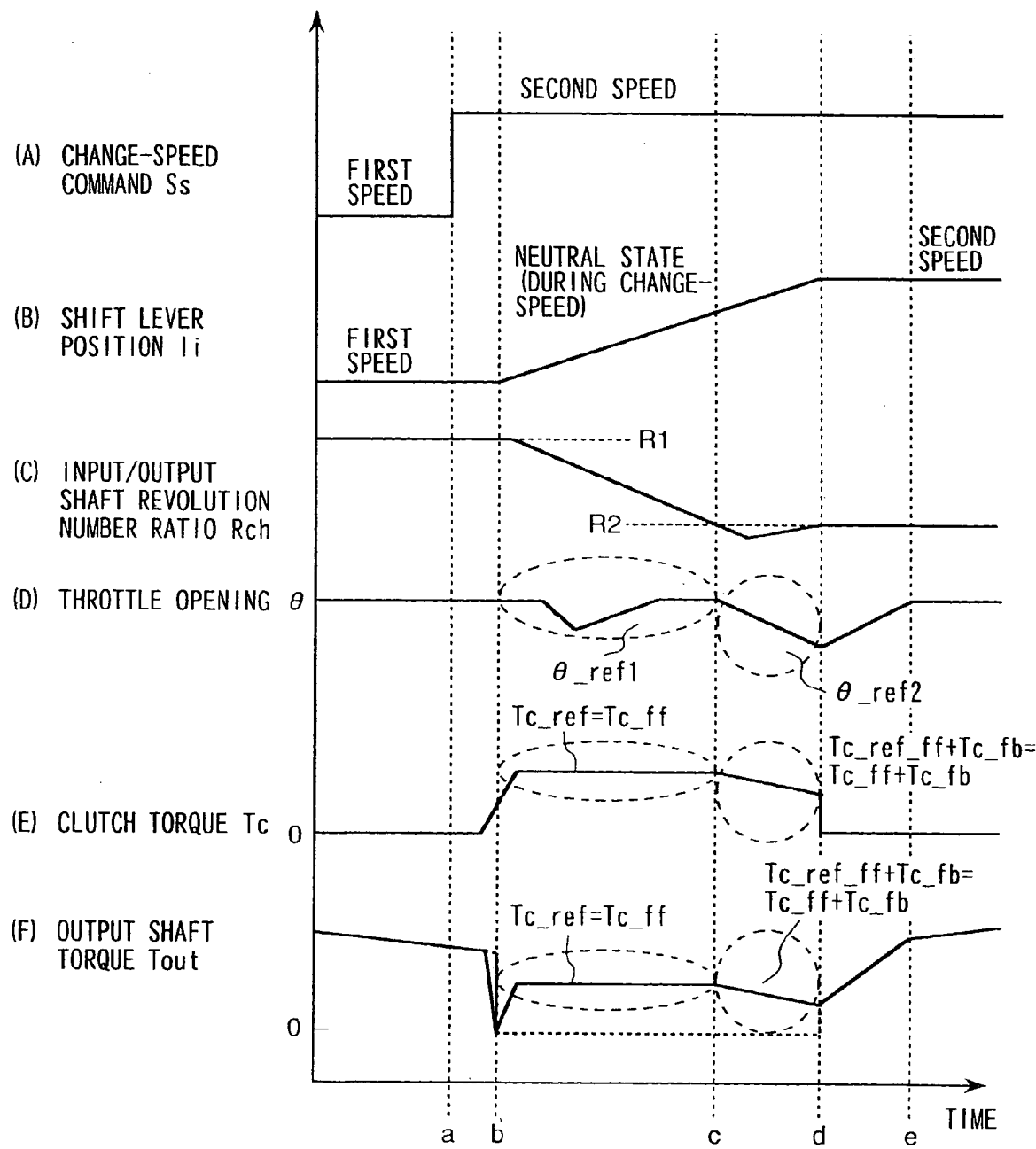

ENGINE TORQUE TRANSMITTING PATH ------>

MOTOR TORQUE TRANSMITTING PATH ⎯⎯⎯>

CONTROL DEVICE AND CONTROL METHOD FOR A VEHICLE

BACKGROUND OF THE INVENTION

This invention relates to a control device for a vehicle and a control method for a vehicle.

Japanese Patent Application Laid-Open No.61-45163 (1986) describes a control device for a vehicle using a gear type transmission. This control device is constructed to achieve smooth speed changing by including a friction clutch on a gear providing the minimum change-speed ratio to the gear type transmission, controlling the number of revolution of the input shaft of the transmission by sliding said friction clutch during the change-speed to synchronize it with the number of revolution of the output shaft of the transmission, and correcting torque reduction occurring during the change-speed with the torque transmitted by said friction clutch.

However, in the prior art control device there is a problem that if during the change-speed the control of the number of revolution only by using the friction clutch, a occupant would receive a sense of incompatibility due to fluctuation of the torque of the output shaft corrected by the friction clutch.

Also, there is a problem that, of the end of the speed, if the torque reduction correcting value during the change-speed corrected by the friction clutch does not match to the torque of the input shaft which is transmitted to the output shaft by a claw clutch, a torque step is caused at the time of the change-speed whereby shaft vibration is generated after the change-speed.

SUMMARY OF THE INVENTION

An object of this invention is to improve transmission ability for a vehicle by suppressing the fluctuation of the torque of the output shaft caused from the control of the number of revolution during the change-speed and by reducing a torque step at the end of the change-speed.

This invention relates to a control device for a vehicle having torque transmitting means between the input shaft of a gear type transmission and the output shaft thereof. The torque transmitting means of at least one speed changing stage is comprised by a friction clutch, while the torque transmitting means of the other speed changing stages are comprised by a mesh type clutch. The friction clutch is controlled when the change-speed is effected from the one speed changing stage to the other changing stage. The control device according to the invention comprises torque reduction correcting means, operative, at the time of said change-speed, for correcting the torque reducing part of said output shaft occurring during the change-speed, and revolution number controlling means for controlling the revolution number of said input shaft on the basis of the torque reduction correcting value corrected by said torque reduction correcting means.

Further, the control device according to this invention is characterized in that it further comprises torque adjusting means for adjusting the torque of said input shaft at the end of the change-speed on the basis of said torque reduction correcting value.

Also, this invention relates to a control method for a vehicle wherein torque transmitting means is attached between the input shaft of a gear type transmission and the output shaft thereof. The torque transmitting means of at least one speed changing stage is comprised by a friction clutch, while the torque transmitting means of the other speed changing stages are comprised by a mesh type clutch. The friction clutch is controlled when the change-speed is effected from the one speed changing stage to the other changing stage.

The control method according to the invention comprises the steps of correcting, at the time of said change-speed, the torque reducing part of said output shaft occurring during the change-speed, and controlling the revolution number of said input shaft on the basis of the torque reduction correcting value corrected by said torque reduction correcting mean.

Further, the control method according to this invention is characterized in that it further comprises the step of adjusting the torque of said input shaft at the end of the change-speed on the basis of said torque reduction correcting value.

Other objects, advantages and novel features of the present invention will become apparent from the following detailed description of the invention when considered in conjunction with the accompanying drawings.

BRIEF DESCRIPTION OF THE DRAWINGS

FIG. 2 is a diagram showing a torque transmitting path in case where the vehicle is running by the driving power of an engine;

FIG. 3 is a diagram showing a torque transmitting path during change-speed;

FIG. 7 is a time chart showing the control state at the time of the change-speed in one embodiment of this invention;

DETAILED DESCRIPTION OF THE PREFERRED EMBODIMENTS

Embodiments of this invention will be explained in detail on the basis of the drawings.

Figure 1:
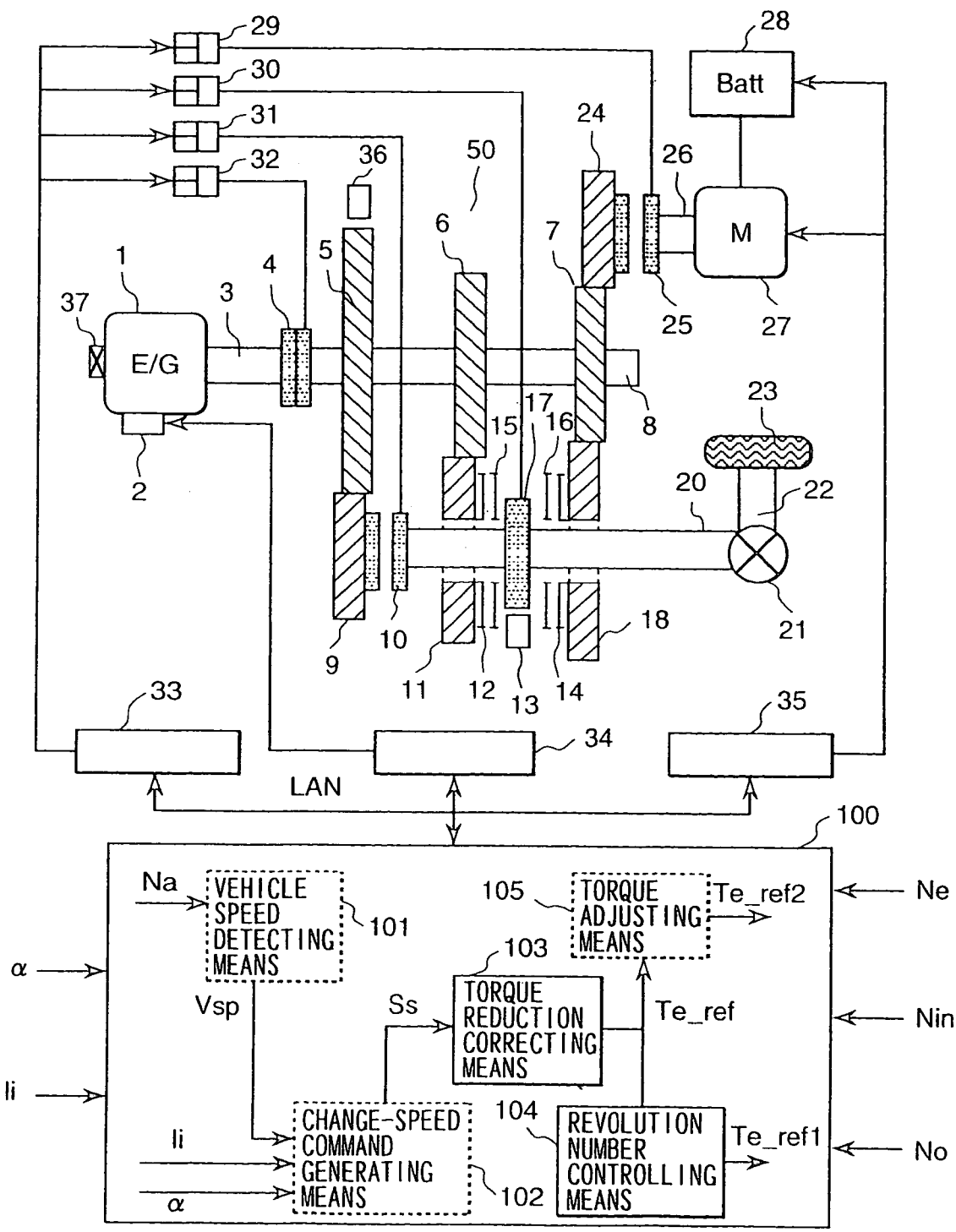
FIG. 1 is a block diagram of a vehicle system and its control device which is one embodiment of this invention.

FIG. 1 is a block diagram for a vehicle system and its control device according to one embodiment of this invention.

An engine 1 includes an electronically controlling throttle 2 for adjusting engine torque and a revolution or engine speed sensor 37 for measuring the number of revolution of the engine 1, Ne. Thus, it is possible to control the output torque of the engine with a high degree of accuracy.

A clutch 4 is attached between the output shaft 3 of the engine 1 and the input shaft 8 of a gear type transmission 50 so that the torque of the engine 1 can be transmitted to the input shaft 8. The clutch 4 as used is of a dry single plate type, in order to control the pressing pressure of the clutch 4 a hydraulically driven actuator 32 is utilized, and power transmission from the output shaft 3 of the engine 1 to the input shaft 8 can be interrupted by adjusting the pressure of the clutch 4.

The input shaft 8 has gears 5, 6 and 7 attached thereto.

The gear 5 is used also as a detector for detecting the number of revolution of the input shaft 8, Nin. It is possible to detect the revolution of the input shaft 8, by detecting the movement of the teeth of the gear 5 with a sensor 36.

A motor 27 has an output shaft 26 to which a gear 24 having a clutch 25 is connected. The gear 24 is adapted to engage with the gear 7 all the time. The clutch 25 as used is of a dry single plate type which enables the transmission of the output torque of the motor 27 to the gear 24. The control of the pressure of the clutch 25 is performed by an actuator 29 which is hydraulically driven, and power transmission from the output shaft 26 to the input shaft 8 can be interrupted by adjusting the pressure of the clutch 25.

The gear type transmission 50 includes an output shaft 20 which comprises a gear 18 having a gear 14 and a synchronizer ring 16, a gear 11 having a gear 12 and a synchronizer ring 15, a hub 17 directly coupling the gear 18 and a gear 11 to the output shaft 20, and a sleeve (not shown). The gear 18 and the gear 11 have respective stoppers (not shown) for preventing any movement thereof in the axial direction on the output shaft 20. Further, this hub 17 has inside grooves (not shown) engaging with a plurality of grooves (not shown) of the output shaft 20, whereby the hub 17 is coupled to the output shaft 20 so that the former can relatively move axially with respect to the latter but any relative movement in the rotational direction is limited. Therefore, the torque of the hub 17 is transmitted to the output shaft 20.

In order to transmit the torque from the input shaft to the hub 17, it is needed to move the hub 17 and the sleeve in the axial direction with respect to the output shaft 20 to couple directly the hub 17 to the gear 14 or the gear 12 through the synchronizer ring 16 or the synchronizer ring 15. A hydraulically driven actuator 30 is used to move the hub 17 and the sleeve.

The hub 17 is also used as a detector for detecting the number of revolution No of the output shaft 20. In this case, it is possible to detect the revolution number of the output shaft 20 by detecting the revolution of the hub 17 with a sensor 13.

A claw clutch mechanism acting as torque transmitting means comprising the hub 17 and the sleeve; the gear 14 and the synchronizer ring 16; and the gear 12 and synchronizer ring 15 is referred to a mesh type clutch.

This mechanism enables to transmit energy from a power source such as the engine 1 to a tire 23 through a differential device 21 and an axle 22 with high efficiency, thereby to aid in 5 decreasing fuel consumption.

Further, the output shaft 20 includes a gear 9 having clutch 10. The clutch 10 is constituted by a wet type multiple plate type friction clutch so that the torque of the input shaft 8 can be transmitted to the output shaft 20. The control of the pressure of the clutch 10 is performed by an actuator 32 which is hydraulically driven, and power transmission from the input shaft 8 to the output shaft 20 can be interrupted by adjusting this pressure.

The speed changing ratio of the gear 5 and the gear 9 is made smaller than the speed changing ratio of the gear 7 and the gear 18, and the speed changing ratio of the gear 6 and the gear 11.

In the engine 1, the amount of intake air is controlled by the electronically controlled throttle 2 attached to an intake pipe (not shown), and the fuel of the amount corresponding to the amount of intake air is injected from a fuel injecting device (not shown). Also, ignition timing is determined on the basis of an air fuel ration defined by the amount of air and the amount of fuel as well as signals such as the number of revolution of the engine, Ne, and ignition is effected by an ignition device (not shown).

As the fuel injection device, there are an intake port fuel injecting system in which fuel is injected to an intake port, and a cylinder fuel injecting system in which fuel is injected directly into a cylinder, but it is preferable to select a system which enables to decrease fuel consumption and is superior to exhaust gas ability, comparing operation areas (areas determined by the engine torque and the engine revolution number) required by the engine.

Next, a control device 100 will be explained for controlling the engine 1, the actuators 29, 30, 31 and 32, and the motor 27.

The control device 100 receives as input signals an accelerator pedal controlling amount signal, a shift lever position signal Ii, an engine revolution number signal Ne detected by a sensor 37, an input shaft revolution number signal Nin detected by a sensor 36 and an output shaft revolution number signal No detected by a sensor 13. In response thereto, the control device 100 computes the torque Te of the engine 1, and sends it to a control device 34 through a LAN constituting communication means.

The control device 34 computes the degree of throttle valve opening, the amount of fuel and ignition timing for achieving the received engine torque, and controls respective actuators (for example, the electronically controlled throttle 2).

Also, the control device 100 computes the torque and the number of revolution of the motor 27, and sends them to a control device 35 through the LAN to control the motor. The control device 35 functions to charge a battery 28 with power obtained from the motor 27 and supply a power from the battery 28 to the motor 27 for driving it.

The control device 100 comprises vehicle speed detecting means 101, change-speed command generating means, torque reduction correcting means 103, revolution number controlling means 104 and torque adjusting means 105.

The vehicle speed detecting means 101 computes the vehicle speed Vsp on the basis of the output shaft revolution number No detected by the sensor 13 (in this case, the computation is performed as Vsp=f(Nm) using function f).

The change-speed command generating means 102 determines a speed changing command Ss on the basis of the input accelerator pedal controlling amount and the vehicle speed Vsp found by the vehicle speed detecting means 101. The speed changing command Ss is selected from values stored in memory means (not shown) within the control device 100, said values being found by a pre-experiment or a simulation as ones giving the maximum efficiency to the engine 1 and motor 27.

Now, the control of the clutch 10 will be explained when the speed changing stages is altered (speed changed) from first (1) speed operation state to second speed (2) operation state, using FIG. 2, FIG. 3 and FIG. 4. The control of the clutch 10 is effected by controlling the actuators 29 to 32 on the basis of the commands from the control device 100 so that the control device 33 controls the gear type transmission 50.

FIG. 2 is a view for explaining the first state operation speed in case where the vehicle is intended to be accelerated when it runs with the driving force of the engine 1. In the drawings, dotted arrow lines indicate torque transmitting paths. As one example, it is assumed where the clutch 4 has been coupled and the mesh type clutch (hub 17) has been coupled to the gear 18. In this condition, the torque of the engine 1 is transmitted to the output shaft 20 trough the clutch 4, the input shaft 8, the gear 7 and the gear 18. At that time, the clutch 10 is in the released condition.

When the change-speed command Ss is output by the change-speed command generating means 102, the mesh type clutch (hub 17) is made the released condition to release the coupling between the gear 18 and the output shaft 20, as shown in FIG. 3. At the same time, the actuator 31 is controlled to press and couple the clutch 10, thereby to transmit the torque of the engine 1 from the output shaft 3 through the clutch 4, the input shaft 8, the gear 5, the gear 9 and the clutch 10 to the output shaft 20. Thus, when the torque of the engine 1 is transmitted to the axle 22 with the pressing pressure of the clutch 10 to make it the driving torque for the vehicle, the gears 5 and 9 are used and the speed changing ratio becomes smaller. As a result, the load of the engine 1 becomes larger and the number of revolution decreases, whereby the speed changing ratio between the output shaft 20 and the input shaft 8 leaves the speed changing ratio of the first speed and approaches to the speed changing ratio of the second speed (the direction that the speed changing ratio becomes smaller).

Figure 4:
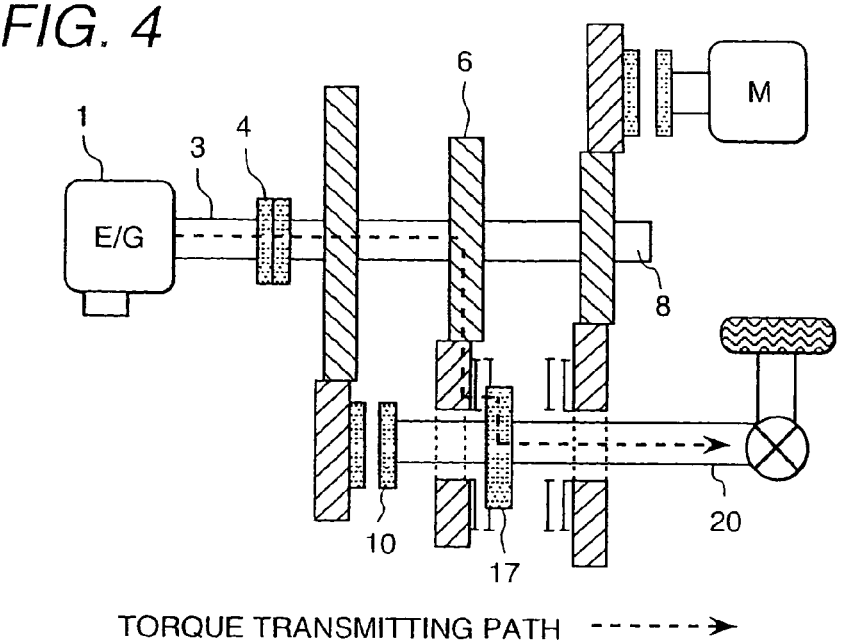
FIG. 4 is a diagram showing a torque transmitting path after the end of the change-speed.

Then, when the speed changing ratio between the input shaft 8 and the output shaft 20 becomes the change-speed ratio of the second speed, the mesh type clutch (hub 17) is coupled to the gear to couple the gear 11 to the output shaft 20, as shown in FIG. 4. As soon as this coupling is completed, the actuator 31 is controlled so that the change-speed from the first speed to the second speed is completed by releasing the pressure of the clutch 10. In this second speed operation state, the torque of the engine 1 is transmitted through the transmitting path passing the output shaft 3 of the engine 1, the clutch 4, the input shaft 8, the gear 6, the gear 11, the hub 17 and the output shaft 20 in the order.

From the above-mentioned explanation, it is appreciated that although at the time of the change-speed a neutral state is created by releasing the first speed condition, since at that time the torque of the engine I is adapted to be transmitted to the axle 22 by the clutch 10 and the gears 5 and 9, it is possible to correct any torque reduction occurring during this change-speed.

Now, a control method at the time of the change-speed in the vehicle control device of this embodiment will be explained by using FIG. 5 to FIG. 7.

First, control processes in the torque reduction correcting means 103 will be explained.

Figure 5:
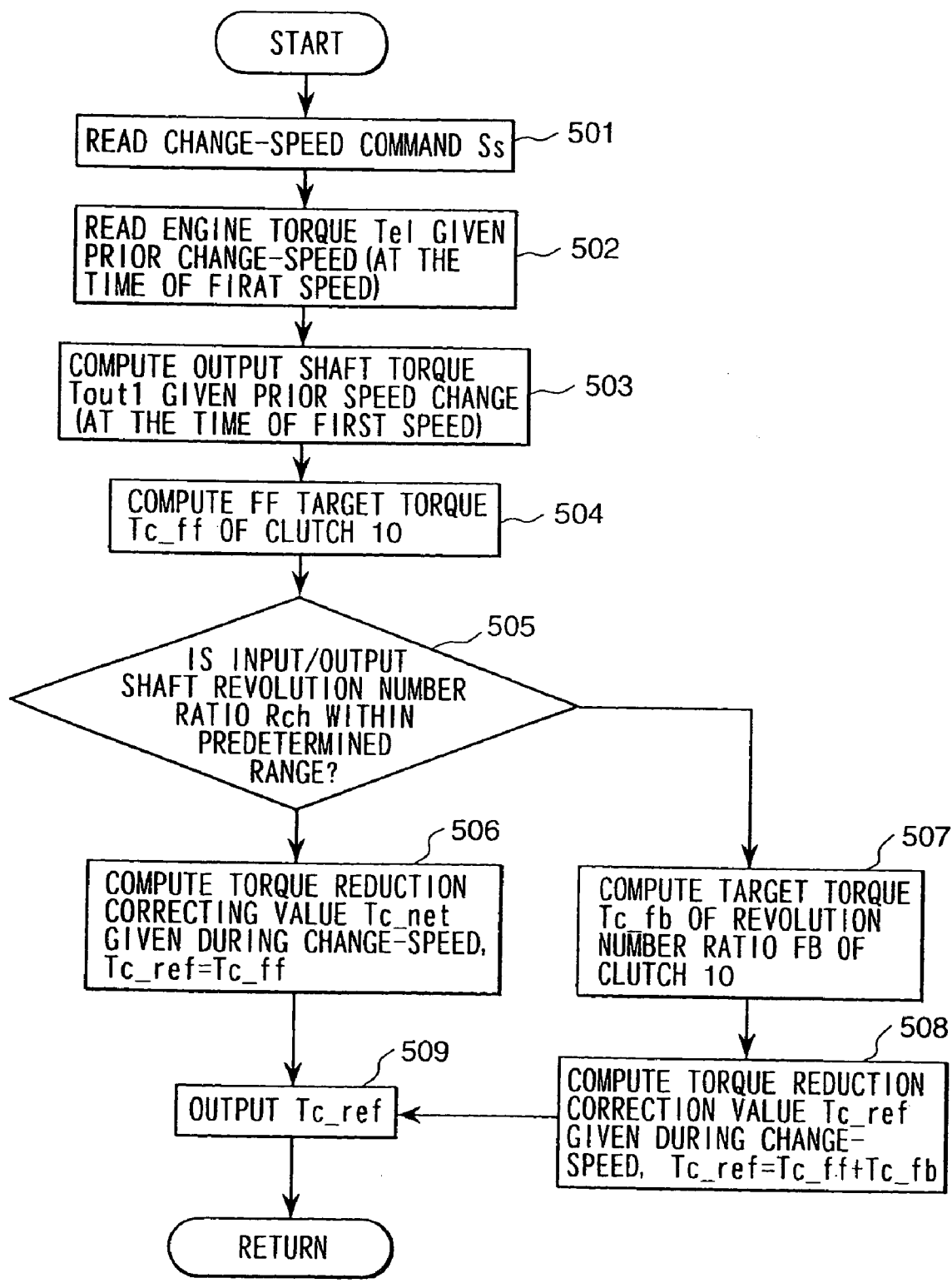
FIG. 5 is a flow chart of control processes in the torque reduction correcting means of the control device according to one embodiment of this invention.

FIG. 5 is a flow chart for the control processes in the torque reduction correcting means 103.

Step 501

In this step, a change-speed command Ss output from the change-speed command generating means 102 is read.

Step 502

In this step, the torque Te1 of the engine 1 before the change-speed (during the first speed), received by the control device 34 through the LAN is read.

Step 503

In this step, the torque Tout1 of the output shaft 20 before the change-speed (during the first speed) is computed on the basis of the torque Te1 of the engine 1 before the change-speed, read in Step 502.

Step 504

In this step, the FF (Feed Forward) target torque Tc_ff of the clutch 10 is computed on the basis of the torque Tout1 of the output shaft 20 computed in Step 503. Also, assuming that the change-speed ratio at the first speed is referred to R1, the change-speed ratio at the second speed is referred to R2, the engine revolution number before the change-speed is referred to Ne1 and the engine revolution number after the change-speed (at the time of the second speed) is referred to Ne2, the engine revolution number Ne2 after the change-speed may be presumed as Ne2 Ne1×(R2/R1). Further, it is possible to find the engine torque after the change-speed in response to the presumed engine revolution number Ne2 and the amount of throttle opening, and the output shaft torque after the change-speed, Tout 2 can be also presumed. It is possible to compute the FF target torque Tc_ff of the clutch 10 depending upon this presumed torque Tout2.

Step 505

In this step, it is determined whether an input/output shaft revolution number ratio Rch which is found by the engine revolution number Ne (input shaft revolution number Nin) and the output shaft revolution number No is within a predetermined range. If it is not within the predetermined range, the process proceeds to Step 506, and if it is within the predetermined range, the process proceeds to Step 508.

Step 506

In this step, in case where during the change-speed the input/output shaft revolution number ratio Rch is not within the predetermined range, the torque reduction correcting value during the change-speed, Tc_ref is computed as Tc-ref=Tc_ff.

Step 507

In this step, in case where during the change-speed the input/output shaft revolution number ratio Rch is within the predetermined range, by feeding back an error between the target revolution number ratio corresponding to the change-speed ratio of the second speed and the input/output shaft revolution number ratio Rch, the revolution number ratio FB (Feed Back) target torque Tc_fb is computed. At that time, the revolution number ratio FB target Tc_fb of the clutch 10 may be computed by computing the target engine revolution number (input shaft revolution number) depending upon the target revolution number ratio and feeding back the engine revolution number Ne.

Step 508

In this step, the torque reduction correcting value Tc_ref during the change-speed is computed as Tc-ref=Tc-ff+Tc-f b.

Step 509

In this step, the torque reduction correcting value Tc_ref during the change-speed Tc-ref found in Step 506 and Step 508 is output as the target torque of the clutch 10. The output torque reduction correcting value Tc-ref is sent to the control device 33 through the LAN.

The control device 33 is a control device for driving hydraulically the actuators 29 to 33, and controls the actuator 31, thereby to correct any torque reducing part during the change-speed on the basis of the value of Tc_ref by adjusting the pressing pressure of the clutch 10.

As explained above, in the torque reduction correcting means, it is possible to improve change-speed ability by correcting the torque reducing portion of the output shaft 20 occurring during the change-speed.

Next, control processes in the revolution number controlling means 104 and the torque adjusting means 105 will be explained.

Figure 6:
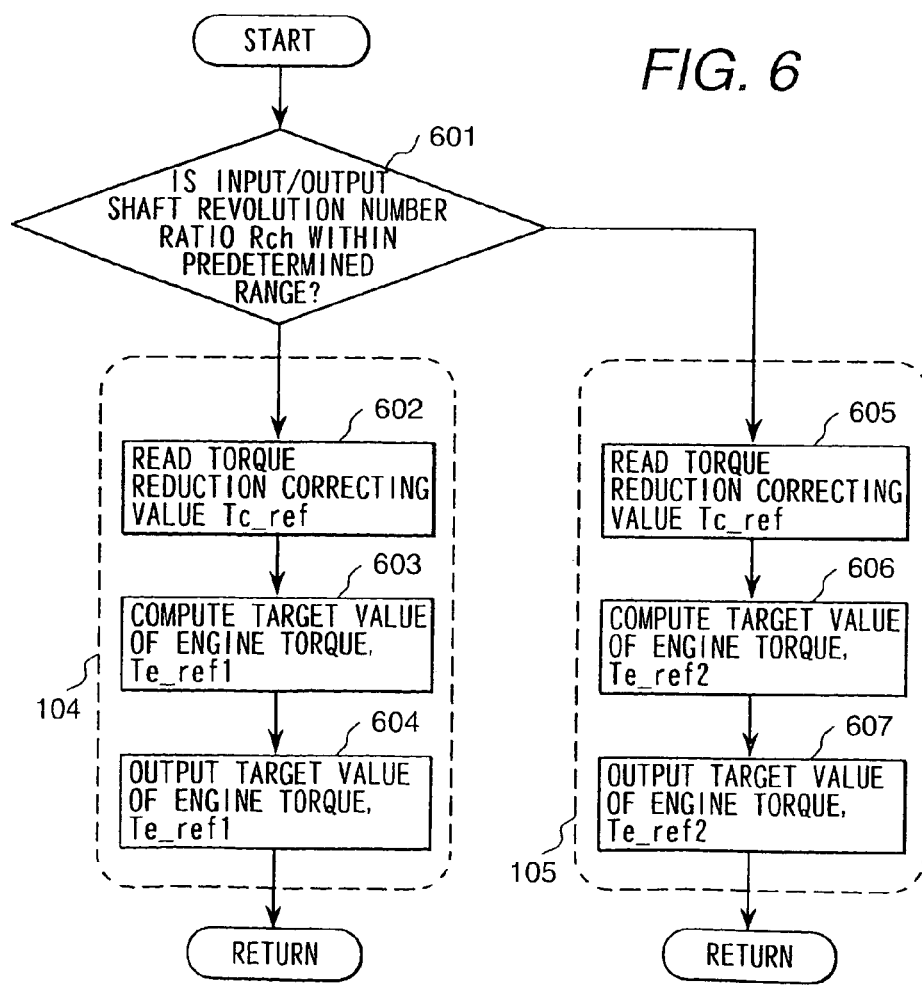
FIG. 6 is a flow chart of control processes in the revolution number controlling means and the torque adjusting means of the control device according to one embodiment of this invention.

FIG. 6 is a flow chart for the control processes in the revolution number controlling means 104 and the torque adjusting means 105.

Step 601

In this step, it is determined whether the input/output shaft revolution number ratio Rch found on the basis of the engine revolution number Ne (input shaft revolution number Nin) and the output shaft revolution number No is within a predetermined range if it is not within the predetermined range, the process proceeds to Step 602 in which control processes are preformed by the revolution number controlling means 104, and if it is within the predetermined range, the process proceeds to Step 603 in which control processes are performed by the torque adjusting means 105.

First, control processes in the revolution number controlling means 104 which are effected in Step 602 to Step 604 will be explained.

Step 602

In this step, the torque reduction correcting value Tc-ref found according to Tc_ref=Tc-ff is read.

Step 603

In this step, the target torque of the engine 1, Te-ref1 achieving the revolution number Ne of the engine 1, Ne giving the predetermined input/output shaft revolution number ratio Rch is computed on the basis of the torque reduction correcting value Tc-ref as read in Step 602.

Step 604

In this step, the target torque Te-ref1 of the engine 1 found in Step 603 is output. The output target torque Te-ref1 of the engine 1 is sent to the control device 34 through the LAN.

The control device 34 controls the electronically controlled throttle 2 so that the target torque Te-ref1 of the engine 1 is achieved.

Also, in the revolution number controlling means 104, in order to achieve the target torque Te_ref1l of the engine 1, the air fuel ratio of the engine 1 may be controlled, or ignition timing may be controlled.

As explained above, in the embodiment, it is possible to couple the mesh type clutch as the second condition by controlling the revolution number of the input shaft 8 during the change-speed using the revolution number controlling means 104, and also to improve change-speed ability by controlling inertia torque at the time of the coupling to the second speed.

Next, control processes in the torque controlling means 105 effected in Step 605 to Step 607 will be explained.

Step 605

In this step, the torque reduction correcting value Tc-ref found according to Tc_ref=Tc-ff+Tc-fb is read.

Step 606

In this step, the target torque Te_ref2 of the engine 1, making smaller a deviation between the output shaft torque after the change-speed and the torque reduction correcting value Tc-ref is computed on the basis of the torque reduction correcting value Tc-ref read in Step 605.

Step 607

In this step, the target torque Te-ref2 of the engine 1 found in Step 606 is output. The output target torque Te-ref2 of the engine 1 is sent to the control device 34 through the LAN.

The control device 34 controls the electronically controlled throttle 2 so that the target torque Te_ref 2 of the engine 1 is achieved.

Also, in the torque adjusting means 105, in order to achieve the target torque Te_ref2 of the engine 1, the air fuel ratio of the engine 1 may be controlled, or ignition timing may be controlled.

As explained above, in the torque adjusting means 105, it is possible to make smaller the deviation between the torque reduction correcting value during the change-speed and the torque of the output shaft 20 after the change-speed by controlling the torque of the input shaft 8 at the end of the change-speed, and also it is possible to improve speed changing ability by decreasing the torque step thereby to restrain any shaft vibration or fluctuation after the change-speed.

Next, the operation at the time of the change-speed will be explained.

FIG. 7 is a time chart showing the control condition at the time of the change-speed. In FIG. 7, (A) shows a speed changing command Ss, (B) a shift lever position corresponding to a mesh type clutch position, (C) the input/output shaft revolution number ratio Rch, (D) the degree of throttle opening E, (E) the torque Tc of the clutch 10, and (F) the torque Tout of the output shaft 20. Also, the axis of abscissa represents time.

As shown in (A), when during the driving at the first speed the change-speed command Ss instructing the second speed is output at point a, the speed changing control is started, and as shown in (E) the torque TC of the clutch 10 gradually increases.

As the torque Tc of the clutch 10 gradually increases, as shown in (F) the torque Tout of the output shaft 20 gradually decreases and at point b, the mesh type clutch which has been coupled at the first speed side becomes releasable. That is, due to the torque to be transmitted with the gears 5 and 9, the torque to be transmitted with the gear 7 and 18 decreases to a value making the mesh type clutch releasable.

When the mesh type clutch becomes the releasable the mesh type clutch which has been coupled at first speed side is released by the control of the actuator 30, and the shift lever position Ii becomes a neutral state (during the change-speed), whereby the actual change-speed is initiated.

When the shift lever position Ii becomes the neutral state, as shown in (E) the control of the clutch 10 for correcting the torque reduction part occurring during the change-speed is started, and the actuator 31 is controlled in accordance with the value of the target torque Tc_ref =Tc-ff of the clutch 10 output from the torque reduction correcting means 103, whereby as shown in (F) any torque reduction part of the output shaft 20 during the change-speed is corrected.

At that time, since the torque transmitted by the clutch 10 becomes equal to the torque of the output shaft 20, it is preferable that the target torque Tc-ref of the clutch 10 has a smooth property to reduce the sense of discomfort which an occupant would receive. Also, it is needed to control, during the change-speed, the input/output shaft revolution number ratio Rch rapidly and smoothly so that it becomes the speed changing ratio R2 of the second speed.

Therefore, in order to obtain the target torque Te-ref1 of the engine 1 output by the revolution number controlling means 104, the engine revolution number Ne is adjusted by controlling the throttle opening so that it becomes $\Theta=\Theta\_ref1$ as shown in (D), whereby the input/output revolution number ratio Rch is caused to be close to the speed changing ratio R2 of the second speed.

By such control of the clutch 10 and the electronically controlled throttle 2, as shown in (C) the input/output shaft revolution number ratio Rch becomes R hR2 at point c, but it is preferable that to cause the mesh type clutch to couple, the engine revolution number Ne is increased to match the input/output shaft revolution number ratio Rch to the speed changing ratio R2. This is disadvantageous since the number of revolution No of the output shaft 20 has been increased by the torque reduction correcting value corrected during the change-speed, if the mesh type clutch is tried to be coupled at the time when the revolution number of the input shaft 8 is in the direction of its decrease, torque interference occurs at the biting portions of the mesh type clutch, which makes the coupling difficult. This is because the way by which the mesh type clutch is coupled in the direction in which the number of revolution of the input shaft 8 increases gives lesser torque interference.

Since after point c the relationship between Rch and R2 becomes Rch<R2, it is needed to increase the input/output shaft revolution number ratio Rch. However, since just before the coupling (between point c and point d), with the control of the engine torque Te a slight delay occurs in its response, it is preferable to adjust the input/output shaft revolution number ratio Rch with the torque of the clutch 10. To this end, during the period from point c to point d, the revolution number ratio FB target torque Tc_fb depending upon the deviation between the input/output shaft revolution number ratio Rch and the speed changing ratio R2 at the second speed is added, thereby to set the target torque of the clutch 10 to Tc-ref =Tc-ff+Tc-fb.

As described above, by feeding back the input/output shaft revolution number ratio during only a period in which the deviation between the input/output shaft revolution number ratio Rch and the speed changing ratio at the second speed is small, it is possible to restrain, to the minimum, the torque variation of the torque reduction correcting value occurring during the change-speed and it is possible to alleviate the sense of discomfort which the occupant receives. By such revolution number ratio FB control of the clutch 10, the relationship of Rch R2 occurs in the direction in which the input/output shaft revolution number ratio Rch increases, and the mesh type clutch can be coupled at the second speed.

When the mesh type clutch becomes the condition in which it can be coupled at the second speed, the control of the actuator 30 results in the coupling of the mesh type clutch at the second speed. However, at that time, it is preferable that by make smaller the deviation between the torque reduction correcting value Tc_ref=Tc_ff+Tc_fb during the change-speed and the torque of the output shaft 20 after the change-speed (after the coupling at the second speed), the torque step of the output shaft 20 at the end of the change-speed is reduced, thereby to suppress the occurrence of the shaft vibration.

Since the torque reduction correcting value during the change-speed is determined by the torque Tc of the clutch 10 and the torque of the output shaft 20 after the change-speed is determined by the torque Te of the engine 1 and the speed changing ratio R2 at the second speed, between point c and point d the throttle opening is controlled so that it becomes $\Theta=\Theta\_ref2$, so as thereby to achieve the target torque Te_ref2 of the engine 1. Since during the change-speed the clutch 10 is under a slippage condition, if the torque Te of the engine 1 is larger than a predetermined value, the torque reduction correcting value during the change-speed is determined by the torque Tc of the clutch 10 and the inertia torque of the engine 1, whereby it is possible to perform the torque matching control at the end of the change-speed independently of the torque reduction correcting control during the change-speed.

When at point d the actual change-speed is completed by the fact that the mesh type clutch is coupled to the second speed, the throttle opening $\Theta$ is returned gradually to the opening before the change-speed and at point e the speed changing control is finished.

As explained above, in accordance with this embodiment, in the speed changing operation by finding the torque reduction correcting value of the output shaft 20 during the change-speed, controlling the revolution number of the input shaft 8 on the basis of this torque reduction correcting value, and at the end of the change-speed adjusting the torque of the input shaft 8, the torque variation of the transmission output shaft 20 can be suppressed.

Next, a construction of the control device for a vehicle according to the other embodiment of this invention will be explained using FIG. 8 to FIG. 11.

Figure 8:
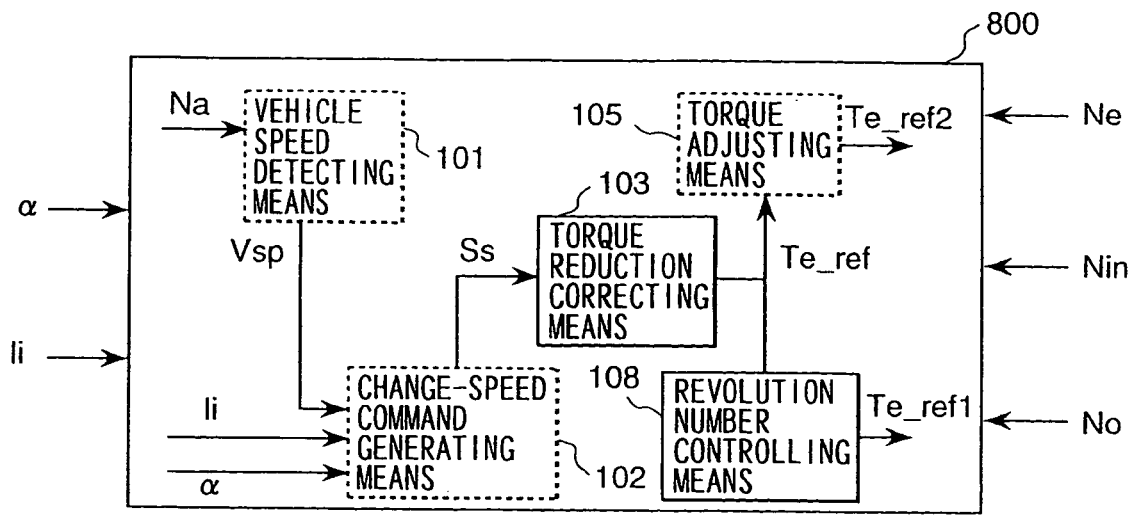
FIG. 8 is a block diagram of a control device for a vehicle according to the other embodiment of this invention.

FIG. 8 is a block diagram for the control device according to this embodiment. Since the overall system construction of the vehicle is the same as one in the embodiment shown in FIG. 1, its explanation is abbreviated. Also, constructive parts in this embodiment equivalent to the constructive parts in the embodiment in FIG. 1 will be explained affixing thereto the same reference numerals.

A control device 800 comprises the vehicle speed detecting means 101, the change-speed command generating means 102, the torque reduction correcting means 103, revolution number controlling means 801 and torque adjusting means 802.

Since the control processes preformed in the vehicle speed detecting means 101 and the change-speed command generating 102 are similar to those in the embodiment shown in FIG. 1, the explanation therefor is abbreviated.

Now, the control for the clutch 10 and the motor 27 at the time when the change-speed is carried out from the first speed operation state to the second speed operation state will be explained using FIG. 9.

Figure 9:
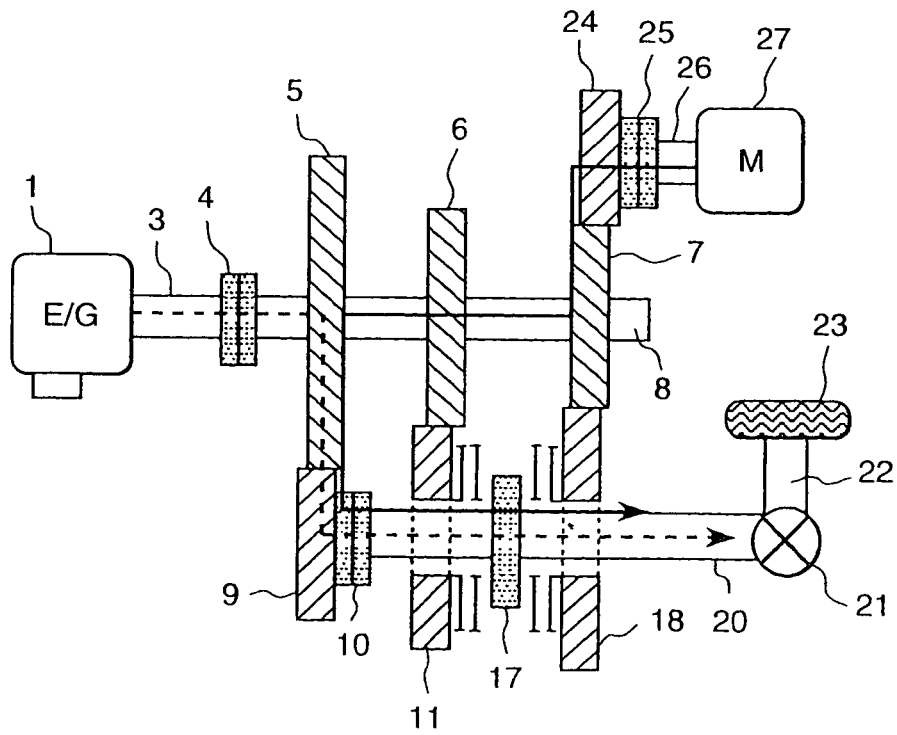
FIG. 9 is a diagram showing a torque transmitting path during the change-speed in the other embodiment of this invention.

When the change-speed command Ss is output by the change-speed command generating means 102, the mesh type clutch (hub 17) is made the uncoupled condition to release the coupling between the gear 18 and the output shaft 20, as shown in FIG. 9. At that time, the clutch 25 has become coupled by the control of the actuator 29. At that time, the torque of the motor 27 is transmitted along a motor torque transmitting path passing the output shaft 26 of the motor 27, the clutch 25, the gear 24, the gear 7, the input shaft 8, the gear 5, the gear 9, the clutch 10 and the output shaft 20 in the order, whereby the revolution number control and the torque adjustment for the input shaft 8 by the motor 27 becomes possible.

During the change-speed, the torque of the engine 1 is transmitted to the output shaft 20 through the gears 5 and 9 by pressing the clutch 10 under the control of the actuator 31. By this pressing pressure for the clutch 10 the torque of the engine 1 is transmitted to the axle 22 to be used as the driving torque of the vehicle, and the revolution number of the engine 1 is decreased because the load of the engine 1 becomes larger as a result of the small speed changing ratio by the use of the gears 5 and 9, whereby the speed changing ratio between the output shaft 20 and the input shaft 8 approaches the speed changing ratio of the second speed (the sense in which it becomes smaller) from the speed changing ratio of the first speed.

At that time, the torque of the engine 1 is transmitted along a transmitting path passing the output shaft 3 of the engine 1, the clutch 4, the input shaft 8, the gear 5, the gear 9. the clutch 10 and the output shaft 20 in the order. Then, when the speed changing ratio between the input shaft 8 and the output shaft 20 becomes the speed changing ratio of the second speed the gear 11 and the output shaft 20 are coupled by coupling the mesh type clutch to the gear 11. As soon as the mesh type clutch is coupled to the second speed state, the actuator 31 is controlled to release the pressing pressure of the clutch 10, whereby the change-speed is completed.

As mentioned above, although at the time of the change-speed the neutral state occurs by releasing the first speed, since at that time the torque of the engine 1 and the motor 27 is transmitted to the axle 22 through the output shaft 20 by the clutch 10 and the gear 5 and 9, it is possible to correct any torque reducing portion occurring during the change-speed.

Figure 10:
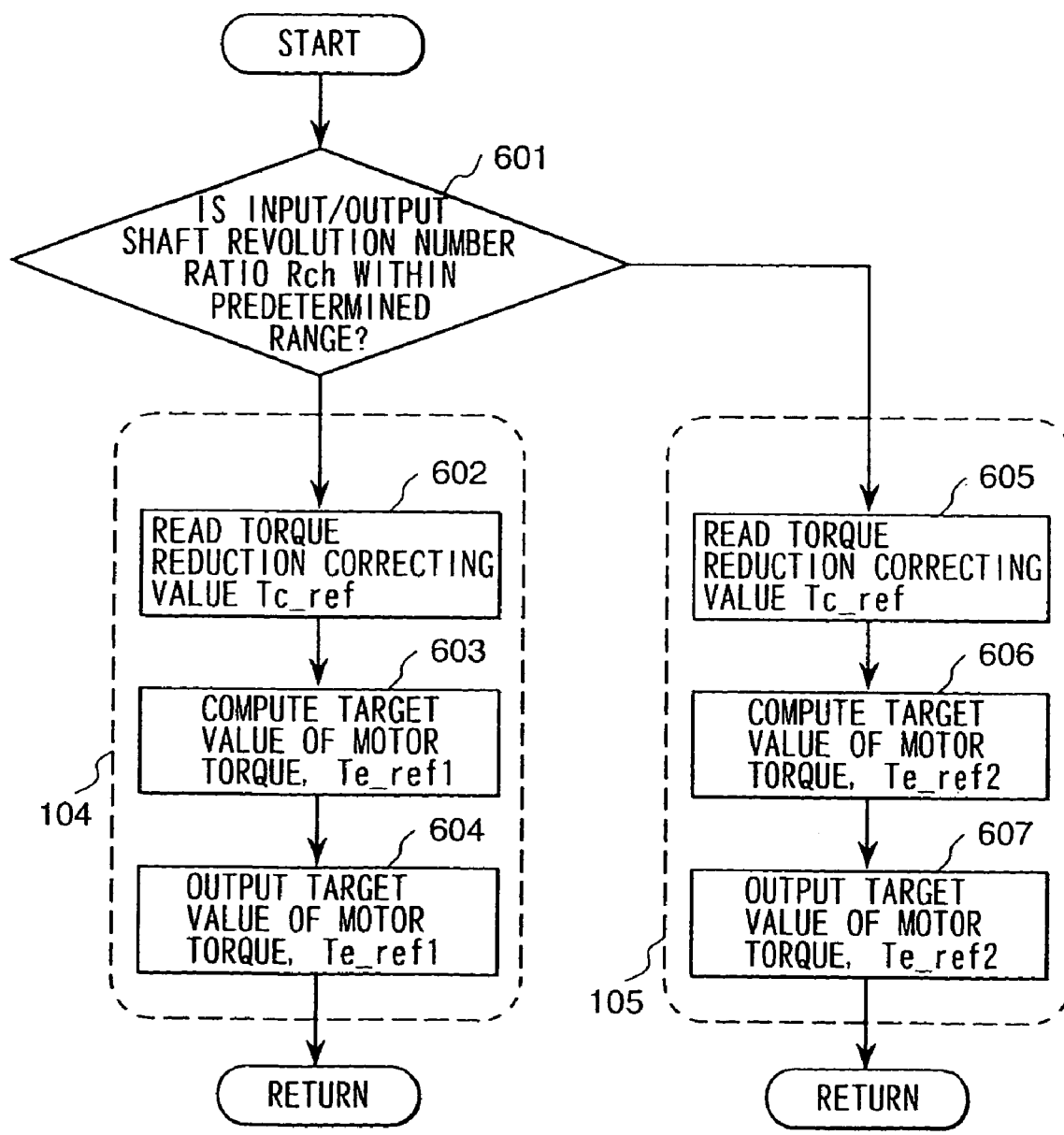
FIG. 10 is a flow chart showing control processes in the revolution number means and the torque adjusting means of the control device for the vehicle according to the other embodiment of this invention.

Now, a control method at the time of the change-speed in the control device for a vehicle according to this embodiment will be explained using FIG. 10 and FIG. 11. Incidentally, since the control processes in the torque reduction correcting means 103 are equivalent to those explained using FIG. 5, the explanation therefor is abbreviated.

First, control processes in the revolution number controlling means 801 and the torque adjusting means 802 will be explained using FIG. 10. FIG. 10 is a flow chart for the control processes performed in the revolution number controlling means 801 and the torque adjusting means 802.

Step 1001

In this step, it is determined whether the input/output shaft revolution number ratio Rch found on the basis of the engine revolution number Ne (input shaft revolution number Nin) and the output shaft revolution number No is within a predetermined range. If it is not within the predetermined range, the process proceeds to Step 1002 in which the control by the revolution number controlling means 801 is performed, and if it is within the predetermined range, the process proceeds to Step 1005 in which the control process by the torque adjusting means 802 is performed.

First, control processes in the revolution number controlling means 801 which are performed in Step 1002 to Step 1004 will be explained.

Step 1002

The torque reduction correcting value Tc_ref found by Tc_ref=Tc_ff is read.

Step 1003

The target torque Tm_ref1 of the motor 27 which achieves the revolution number Ne of the engine 1 effectuating a predetermined input/output shaft revolution Rch is computed on the basis of the torque reduction correcting value Tc_ref read in Step 1002.

Step 1004

In this step, the target torque Tm_ref1 of the motor 27 found in Step 1003 is output. The output target torque Tm_ref 1 of the motor 27 is sent to the control device 35 through the LAN.

The control device 35 controls the motor 27 and the battery 28 to achieve the target torque Tm_ref1 of the motor 27.

As explained above, in the revolution number controlling means 801, it is possible to couple the mesh type clutch to the second speed by controlling the revolution number of the input shaft 8 during the change-speed and it is also possible to improve speed changing ability by suppressing the inertia torque occurring at the time of the second speed coupling.

Next, control processes in the torque adjusting means 802 preformed in Step 1005 to Step 1007 will be explained.

Step 1005

In this step, the torque reduction correcting value Tc_ref founded by Tc_ref=Tc_ff+Tc_fb is read.

In this step, on the basis of the torque reduction correcting value Tc-ref read in Step 1005, the target torque Tm_ref2 of the motor 27 which makes smaller the deviation between the output shaft torque after the change-speed and the torque reduction correcting value Tc_ref is computed.

Step 1007

In this step, the target torque Tm_ref2 of the motor 27 found in Step 1006 is output. The output target torque Tm_ref2 of the motor 27 is sent to the control device 35 through the LAN.

The control device 35 controls the motor 27 and the battery 28 to achieve the target torque Tm_ref2 of the motor 27.

As explained above, in the torque adjusting means 802, by controlling the torque of the input shaft 8 at the end of the change-speed, it is possible to make smaller the deviation between the torque reduction correcting value during the change-speed and the torque of the output shaft 20 after the change-speed, and it is also possible to improve speed changing ability by reducing the torque step, thereby to suppress any shaft vibration occurring after the change-speed.

Next, the operation at the time of change-speed will be explained.

Figure 11:
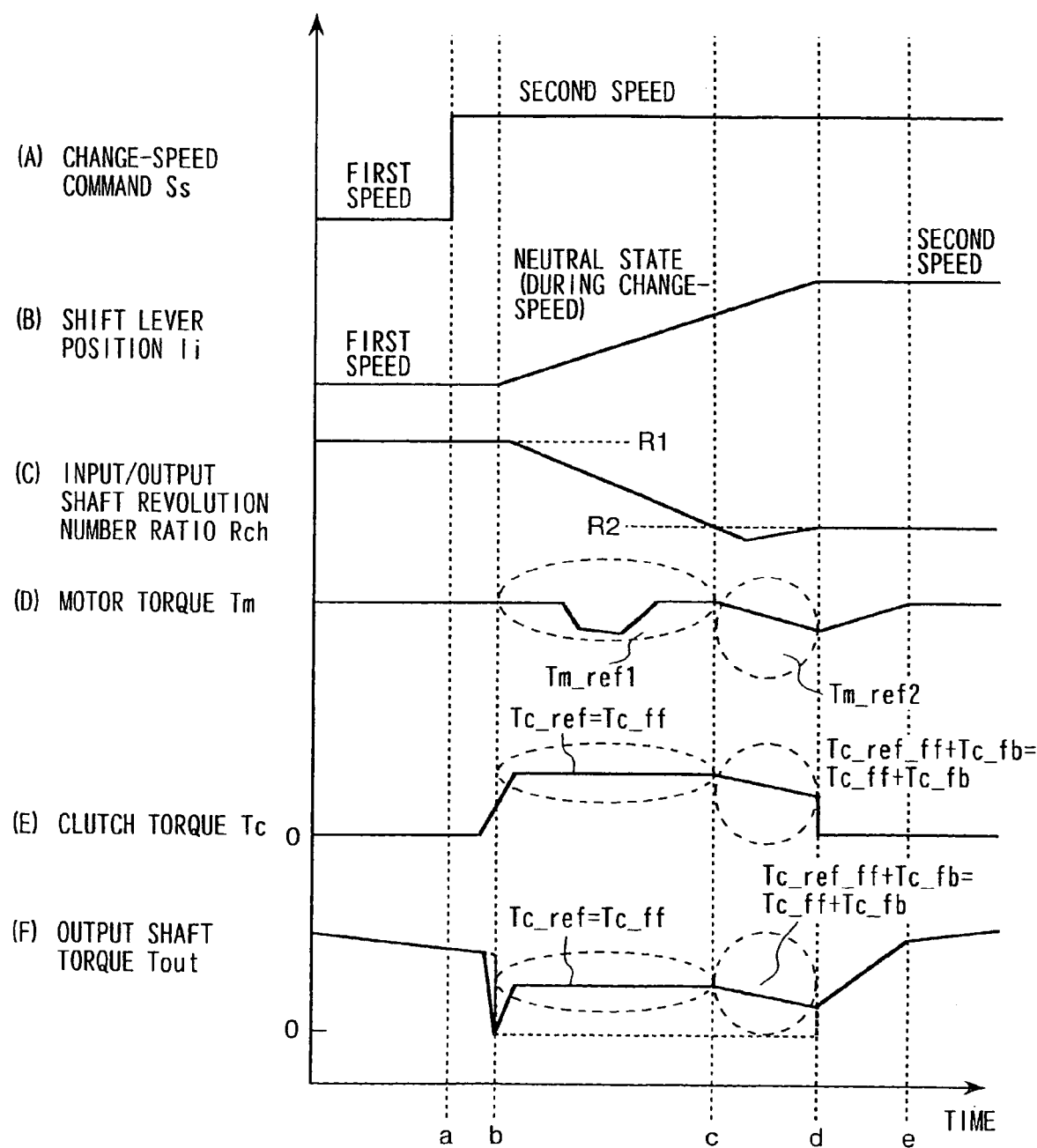
FIG. 11 is a time chart showing a control state during the change-speed in the other embodiment of this invention.

FIG. 11 is a time chart showing a control state at the time of the change-speed. In FIG. 11, (A) indicates a change-speed command Ss, (B) a shift lever position Ii corresponding to a mesh type clutch position, (C) an input/output shaft revolution number ratio Rch, (D) the torque Tm of the motor 27, (E) the torque Tc of the clutch 10 and (F) the torque Tout of the output shaft 20. Also, the abscissa of this time chart indicates time.

As shown in (A), when the speed changing command Ss instructing the second speed is output at point a during traveling at the first speed, speed changing control is started, whereby as shown in (E) the torque Tc of the clutch 10 gradually increases.

As the torque Tc of the clutch 10 increases, as shown in (F) the torque Tout of the output shaft 20 gradually decreases and at point b the mesh type clutch which is being coupled at the first speed side becomes releasable. That is, due to the torque transmitted with the gears 5 and 9, the torque transmitted with the gear 7 and 18 decreases to a value making the mesh type clutch releasable.

When the mesh type clutch becomes releasable by the control of the actuator 30 the mesh type clutch which has been coupled at the first speed side is released, whereby as shown in (B) the shift lever position Ii enters a neutral state (during the change-speed) and the actual change-speed is started.

When the shift lever position Ii enters the neutral state, as shown in (E) the control of the clutch 10 for correcting the torque reduction part occurring during the change-speed is started, and the actuator 31 is controlled in accordance with the value of the target torque Tc_ref=Tc-ff of the clutch 10 output from the torque reduction correcting means 103, whereby as shown in (F) any torque reduction part of the output shaft 20 during the change-speed is corrected.

At that time, since the torque transmitted by the clutch 10 becomes equal to the torque of the output shaft 20, it is preferable that the target torque Tc_ref of the clutch 10 has a smooth property to reduce the sense of discomfort which an occupant would receive. Also, it is needed to control, during the change-speed, the input/output shaft revolution number ratio Rch rapidly and smoothly so that it becomes the speed changing ratio R2 of the second speed.

Therefore, as shown in (D), the motor 27 and the battery 28 are controlled to obtain the target torque Te_ref I of the motor 27 output by the revolution number controlling means 801, thereby to adjust the engine revolution number Ne, whereby the input/output revolution number ratio Rch is caused to be close to the speed changing ratio R2 of the second speed.

By such control of the clutch 10 and the motor 27, as shown in (C) the input/output shaft revolution number ratio Rch becomes Rch=R2 at point c, but it is preferable that to cause the mesh type clutch to couple, the engine revolution number Ne is changed toward its increase, thereby to match the input/output shaft revolution number ratio Rch to the speed changing ratio R2. This is disadvantageous that since the number of revolution No of the output shaft 20 has been increased by the torque reduction correcting value corrected during the change-speed, if the mesh type clutch is tried to be coupled at the time when the revolution number of the input shaft 8 is in the direction of its decrease, torque interference occurs at the biting portions of mesh type clutch, which makes the coupling difficult. This is because the way by which the mesh type clutch is coupled in the direction in which the number of revolution of the input shaft 8 increases gives lesser torque interference.

Since after point c the relationship between Rch and R2 becomes Rch<R2, it is needed to increase the input/output shaft revolution number ratio Rch. However, immediately before the coupling (during points c to d), both of the torque and the revolution number of the motor 27 must be controlled. If as the motor 27 a motor that merely can carry out only one of the torque control and the revolution has been selected, it is needed that the input/output shaft revolution number ratio Rch be adjusted by the torque of the clutch 10. To this end, during the period from point c to point d, the revolution number ratio FB target torque TC_fb depending upon the deviation between the input/output shaft revolution number ratio Rch and the speed changing ratio R2 at the second speed is added, thereby to set the target torque of the clutch 10 to Tc_ref=Tc_ff+Tc_fb.

As described above, by feeding back the input/output shaft revolution number ratio during only a period in which the deviation between the input/output shaft revolution number ratio Rch and the speed changing ratio of the second speed is small, it is possible to restrain, to the minimum, the torque variation of the torque reduction correcting value occurring during the change-speed and it is possible to alleviate the sense of discomfort which the occupant receives. By such revolution number ratio FB control of the clutch 10, the relationship of Rch R2 occurs in the direction in which the input/output shaft revolution number ratio Rch increases, and the mesh type clutch can be coupled at the second speed.

When the mesh type clutch it can be coupled at the second speed, the control of the actuator 30 results in the coupling of the mesh type clutch at the second speed. However, at that time, it is preferable that by make smaller the deviation between Tc_ref−Tc_ff+TC_fb corresponding to the torque reduction correcting value during the change-speed and the torque of the output shaft 20 after the change-speed (after the coupling at the second speed), the torque step of the output shaft 20 at the end of the change-speed is reduced, thereby to suppress the occurrence of the shaft vibration.

Since the torque reduction correcting value during the change-speed is determined by the torque TC of the clutch 10 and the torque of the output shaft 20 after the change-speed is determined by the torque Te of the engine 1, and the torque Tm of the motor 27 and the speed changing ratio R2 at the second speed, between point c and point d the motor 27 and the battery 28 are is controlled so that the target torque Tm_ref2 of the motor 27 is achieved. Since during the change-speed the clutch 10 is under a slippage condition, if the sum of the torque Te of the engine 1 the torque Tm of the motor 27 is larger than a predetermined value, the torque reduction correcting value during the change-speed is determined by the torque Tc of the clutch 10 and the inertia torque of the engine 1 and the motor 27, whereby it is possible to perform the torque matching control at the end of the change-speed independently of the torque reduction correcting control during the change-speed.

At point d the actual change-speed is completed by the fact that the mesh type clutch is coupled to the second speed. After the completion of the change-speed, the torque Tm of the motor 27 is returned to zero gradually, and at point e the speed changing control finishes.

As explained above, in accordance with this embodiment, in the speed changing operation, by finding the torque reduction correcting value of the output shaft 20 during the change-speed, controlling the revolution number of the input shaft 8 on the basis of this torque reduction correcting value, and at the end of the change-speed adjusting the torque of the input shaft 8, the torque variation of the transmission output shaft 20 can be suppressed, thereby to improve the speed changing ability.

Incidentally, this invention is not intended to be limited to the system construction in the above-mentioned embodiments. This invention is applicable to a control device for a vehicle in which the motor 27 is not used. Also, it is possible to use as the clutch 4 and the clutch 10 all types of friction clutches including a dry type single plate clutch, a wet type multiple plate clutch, an electromagnetic clutch, etc. Further, it is possible to use as the clutch 25 all types of clutches including a dry type single plate clutch, a wet type multiple plate clutch, an electromagnetic clutch, a mesh type clutch, etc.

Since this invention is constructed so that any torque variation of the output shaft occurring by the revolution number control carried out during the change-speed and the torque of the input shaft at the end of the change-speed is adjusted, it is possible to reduce any torque step of output shaft and suppress any shaft vibration, thereby to improve speed changing ability for a vehicle.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle control apparatus comprising:
   a gear transmission having,
   plural gears and plural mesh clutches, which are connected selectively for forming first and second torque transmitting paths between an engine and an output shaft, and
   a torque correcting mechanism for transmitting torque temporarily from said engine to said output shaft when said first torque transmitting path is switched to said second torque transmitting path, wherein:

torque of said engine is controlled so as to suppress torque shock during a period when torque decrease of said output shaft is corrected by said torque correcting mechanism.

2. A vehicle control apparatus comprising:

a gear transmission forming torque transmitting paths for transmitting torque from an engine to an output shaft; wherein, said torque transmitting paths comprise a first torque transmitting path and a second torque transmitting path formed by connecting gears and mesh clutches, selectively, and a third torque transmitting path for transmitting torque temporarily from said engine to said output shaft when said first torque transmitting path is switched to said second torque transmitting path; and torque of said engine is controlled so as to suppress torque shock during a period when said third torque transmitting path is formed.

3. A vehicle control system comprising:

an actuator for controlling a torque correcting mechanism that switches selectively between a first torque transmitting path and a second torque transmitting path for transmitting an engine torque to an output shaft, and also transmits said engine torque to said output shaft via a torque transmitting path which differs from said first and second torque transmitting paths; and a controller for controlling said actuator and for controlling said engine torque by controlling an electronic controlling throttle; wherein, said actuator transmits said engine torque to said output shaft temporarily by controlling said torque correcting mechanism when said first torque transmitting path is switched to said second torque transmitting path; and said controller controls said electronic controlling throttle when said actuator controls said torque correcting mechanism and said engine torque, so as to suppress torque shock.

* * * * *